US008620082B1

(12) United States Patent
Cobb et al.

(10) Patent No.: US 8,620,082 B1
(45) Date of Patent: Dec. 31, 2013

(54) SONAR IMAGE TEXTURE SEGMENTATION

(75) Inventors: James T. Cobb, Panama City, FL (US); Gerald J. Dobeck, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 507 days.

(21) Appl. No.: 13/066,230

(22) Filed: Apr. 1, 2011

(51) Int. Cl.
*G06K 9/00* (2006.01)

(52) U.S. Cl.
USPC ......... 382/181; 382/103; 382/173; 382/190; 382/224; 342/73; 342/90; 367/7; 367/21; 367/38; 367/73; 367/100

(58) Field of Classification Search
None
See application file for complete search history.

(56) References Cited

U.S. PATENT DOCUMENTS

| | | | |
|---|---|---|---|
| 5,502,688 A * | 3/1996 | Recchione et al. | 367/131 |
| 5,937,078 A * | 8/1999 | Hyland et al. | 382/103 |
| 6,449,215 B1 * | 9/2002 | Shell | 367/7 |
| 7,307,914 B1 * | 12/2007 | Carter | 367/118 |
| 7,315,485 B1 * | 1/2008 | Stack et al. | 367/11 |
| 7,970,170 B2 * | 6/2011 | Tener et al. | 382/103 |
| 8,326,081 B1 * | 12/2012 | Rikoski | 382/278 |
| 2002/0110279 A1 * | 8/2002 | Dobeck | 382/228 |
| 2007/0280051 A1 * | 12/2007 | Novick et al. | 367/118 |
| 2009/0257312 A1 * | 10/2009 | Novick et al. | 367/119 |

OTHER PUBLICATIONS

Cobb et at., "A Parameterized Statistical Sonar Image Texture Model", Apr. 14, 2008, Proc. SPIE 6953, Detection and Sensing of Mines, Explosive Objects, and Obscured Targets XIII.*
Cobb et al., "A Parametric Model for Characterizing Seabed Textures in Synthetic Aperture Sonar Images" IEEE, Journal of Oceanic Engineering, Apr. 2010, vol. 35, No. 2.*
Cobb et al., "Dynamic tree segmentation of sonar imagery,", 2007, in Proc. SPIE Defense Security Symp., vol. 6553.*
Mignotte et al., "Sonar image segmentation using an unsupervised hierarchical MRF model," Jul. 2000, IEEE Trans. Image Process., vol. 9, No. 7, pp. 1216-1231.*

* cited by examiner

*Primary Examiner* — Matthew Bella
*Assistant Examiner* — Jason Heidemann
(74) *Attorney, Agent, or Firm* — James T. Shepherd

(57) ABSTRACT

Systems and methods for sonar image feature extraction, which fit a parameterized statistical model to sonar image data to extract features that describe image textures for follow-on pattern classification tasks. The systems and methods estimate the parameters of an assumed statistical model from the pixel values in the sonar images. The parameters of the distribution can then be used as features in a discriminant classifier to perform tasks such as texture segmentation or environmental characterization. The systems and methods divide a sonar image into separate overlapping cells. The ACF parameters of each cell are sequentially estimated using various methods. Based on the ACF parameters obtained, each cell is assigned a label via a pattern classification algorithm. The labeled image can be used in target recognition, environmental characterization and texture segmentation.

11 Claims, 8 Drawing Sheets

(HARDPACK SAND)

(SEAGRASS)

(ROCKY)

(SAND RIPPLE)

$(\hat{l}_x)$ $(\hat{l}_y)$

SONAR IMAGE TEXTURE SEGMENTATION

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

Not applicable.

BACKGROUND OF THE INVENTION (1) Field of the Invention

The present invention relates to sonar image feature extraction and more specifically to fitting a parameterized statistical model to sonar image data to extract features that describe image textures for follow-on pattern classification tasks.

(2) Description of the Prior Art

As is known in the art, parameterized statistical modeling of sonar imagery can produce simple, robust quantitative descriptors for complex textured seabed environments. One such known model is a correlated K-distribution model for synthetic aperture radar (SAR) image pixels, with parameters defining spatial correlation lengths in vertical and horizontal dimensions along with a spatial frequency component in one direction to model periodic variation in the autocorrelation function (ACF).

The K-distribution has been shown to adequately describe the single-point amplitude and intensity pixel statistics of sonar images. One known method to derive the K-distribution probability density function (pdf) equation is to treat the sonar intensity scene as being composed of exponentially-distributed speckle modulated by a gamma-distributed parameter in the form of a product of two random variables. Along with its intuitive appeal, this convention allows for the introduction of correlated texture through a correlated gamma distribution.

As is known to those of skill in the art, the analytic expression for the pdf for a K-distributed sonar image intensity pixel I(x,y) is:

$$p_I(x) = \frac{\alpha}{\Gamma(v)} \left(\frac{\alpha}{2}\right)^v (x)^{\frac{v-1}{2}} K_{v-1}(\alpha\sqrt{x}) u(x); v > 0, \quad (1)$$

where $\alpha$ is the scale parameter, $v$ is the shape parameter of the distribution and $K_{v-1}$ is the modified Bessel function of the second kind.

The pixel statistical parameter estimation described above relies on independence between pixel samples. Thus, the correlation between neighboring pixels is ignored. As such, the pdf in Equation (1) describes the one-dimensional statistics of the image pixel values, but does not describe texture.

What is needed is a parameterized statistical model that can be fitted to synthetic aperture sonar image data to extract features or descriptors for follow-on pattern classification tasks. What is further needed is for the model to extract parameters that describe image textures such as correlation length, periodicity or ripple, orientation, and other statistical descriptors for use in automatic target recognition, through-the-sensor environmental characterization, and texture segmentation schemes.

SUMMARY OF THE INVENTION

It is therefore a general purpose and primary object of the present invention to provide a sonar image feature extractor wherein a parameterized statistical model is fitted to sonar image data to extract image texture features, such as correlation length, periodicity or ripple, orientation and other statistical descriptors. Such features can be used in automatic target recognition, through-the-sensor environmental characterization and texture segmentation schemes.

The sonar image texture segmentation model described herein estimates the parameters of an assumed statistical model from the pixel values in the sonar images. The parameters of the distribution can then be used as features in a discriminant classifier to perform tasks such as texture segmentation or environmental characterization.

The model expands the known correlated K-distribution model into a Gaussian mixture model to allow more degrees of freedom including modeling periodicity. The model adds an angular component to parameterize rotation of the autocorrelation function (ACF) about the vertical and horizontal axes. The model further provides a method to estimate texture parameters using an Expectation-Maximization (EM) method for truncated data.

As will be explained in further detail hereinafter, implementing the model includes dividing a sonar image into separate overlapping cells. The overlap amount is a calculated tradeoff between texture parameter resolution and processing speed. The ACF parameters are sequentially estimated using various methods. Based on the ACF parameters obtained, each cell is assigned a label via a pattern classification algorithm. The labeled image can be used in target recognition, environmental characterization and texture segmentation.

The parameters of the ACF of the imaging point spread function (PSF) are estimated using least squares. The shape parameter of the single-point image pixel pdf is estimated using a method known in the art for estimating parameters of K-distributed clutter. The remaining parameters are estimated using the EM method.

In one embodiment, a method of texture segmentation for a sonar image, S(x,y), includes obtaining initial estimates of a first set of parameters of the sonar image, obtaining an estimate of an intensity autocorrelation function (ACF) of the image, and initializing a second set of parameters, $\Theta_i = \{\alpha_i, [\mu_{X_i}, \mu_{Y_i}], \Sigma_i\}$, of the sonar image based on the first set of parameters. Additionally, the method includes initializing a likelihood function based on the first and second sets of parameters, maximizing the likelihood function to obtain updated parameters, calculating an updated intensity ACF based on the updated parameters, and iteratively returning to maximizing the likelihood function until convergence of the updated intensity ACF.

The step of obtaining the estimate of the intensity ACF includes estimating the intensity ACF via discrete two-dimensional Fourier transform:

$$\hat{R}_I(X, Y) = \frac{1}{NO} \cdot F^{-1}\{F\{|S(x, y)|^2\} * \text{conj}(F\{|S(x, y)|^2\})\},$$

for a (N×O) cell of the image. Also, the step of obtaining initial estimates includes estimating a mean intensity, $$\hat{\mu}_I = \frac{1}{NO}\sum_{x_i}\sum_{y_i}S(x_i, y_i),$$

for the (N×O) cell, and estimating an imaging point spread function (PSF) ACF, $\hat{R}_h(X, Y)$, for the cell via discrete two-dimensional Fourier transform based on said mean intensity:

$$\hat{R}_h(X, Y) = \frac{(\hat{\mu}_I)^{-1}}{NO}\cdot F^{-1}\{F\{S(x, y)\} * \text{conj}(F\{S(x, y)\})\}.$$

Obtaining the initial estimates further includes estimating PSF definition variables, $\hat{\beta}_x$ and $\hat{\beta}_y$, via least squares matrix computation based on $\hat{R}_h(X, Y)$ and $\hat{\mu}_I$, and estimating shape parameter, $\hat{v}$, via K-distributed clutter parameter estimation.

The step of maximizing the likelihood function includes calculating a first likelihood parameter $E_j\{\tau_i^{(j)}([\overline{x_j},\overline{y_j}]|\Theta_i^{(j-1)})\}$ from the expression $$\langle\tau_i^{(k)}|\Theta_i^{(k-1)}\rangle_j = \frac{\alpha_i^{(k-1)}G_i([\overline{x_j},\overline{y_j}]|[\mu_{X_i}^{(k-1)}\mu_{Y_i}^{(k-1)}], \Sigma_i^{(k-1)})}{\sum_{i=1}^M \alpha_i^{(k-1)}G_i([\overline{x_j},\overline{y_j}]|[\mu_{X_i}^{(k-1)}\mu_{Y_i}^{(k-1)}], \Sigma_i^{(k-1)})},$$

where $$G_i([\mu_{X_i}\mu_{Y_i}], \Sigma_i) = (2\pi)^{-1}|\Sigma_i|^{-\frac{1}{2}}[XY]-[\mu_{x_i}\mu_{y_i}]]\Sigma_i^{-1}[[XY]^T-[\mu_{x_i}\mu_{y_i}]^T],$$

calculating a scale parameter $$\alpha_i^{(k)} = \frac{\sum_{j=1}^v m_j(\Theta^{(k)})\langle\tau_i^{(k)}|\Theta_i^{(k-1)}\rangle_j}{\sum_{j=1}^v m_j(\Theta^{(k)})},$$

where $$m_j(\Theta^{(k)}) = \begin{cases} n_j, j = 1, \ldots, r \\ n\cdot\frac{P_j(\Theta_j^{(k)})}{P(\Theta^{(k)})}, j = r+1, \ldots, v, \text{ and } \frac{P_j(\Theta)}{P(\Theta)} \end{cases}$$

is a bin probability of an area defined by a resolution cell $(x_j,y_j)$, calculating a vector of component means $$[\mu_{X_i}^{(k)}\mu_{Y_i}^{(k)}]^T = \frac{\sum_{j=1}^v m_j(\Theta^{(k)})\langle\tau_i^{(k)}|\Theta_i^{(k-1)}\rangle_j[\overline{x_j},\overline{y_j}]^T}{\sum_{j=1}^v m_j(\Theta^{(k)})\langle\tau_i^{(k)}|\Theta_i^{(k-1)}\rangle_j},$$

and calculating a matrix variable $$\Sigma_i^{(k)} = \frac{\sum_{j=1}^v m_j(\Theta^{(k)})\langle\tau_i^{(k)}|\Theta_i^{(k-1)}\rangle_j K^T K}{\sum_{j=1}^v m_j(\Theta^{(k)})\langle\tau_i^{(k)}|\Theta_i^{(k-1)}\rangle_j},$$

where $K=[[\overline{x_j},\overline{y_j}]-[\mu_{X_i}^{(k)} \mu_{Y_i}^{(k)}]]$ and $\Sigma_i$ comprises correlation length parameters $l_{x_i}$ and $l_{y_i}$ and ACF rotation parameter $\theta_i$. Maximizing the likelihood function further includes obtaining an updated likelihood function based on the first likelihood parameter, the scale parameter, the vector of component means, and the matrix variable. Further, the method iteratively returns to calculating the first likelihood parameter, the scale parameter, the vector of component means and the matrix variable until convergence of said updated likelihood function. The updated parameters are obtained based on the updated likelihood function.

Additionally, the cell can be a subset of the image and the method can further include dividing the image into a plurality of cells, wherein the cells overlap. Cell parameters associated with the updated intensity ACF for each of the plurality of cells can be stored and textures of the image based on the stored cell parameters can be classified.

In another embodiment, a method of segmenting textures in a sonar image, S(x,y), includes dividing the image into a plurality of (N×O) cells, wherein the cells overlap, and obtaining initial estimates of a first set of parameters of a first one of the cells. The method also includes obtaining an estimate of an intensity autocorrelation function (ACF), $\hat{R}_I(X, Y)$, of the first cell via discrete two-dimensional Fourier transform:

$$\hat{R}_I(X, Y) = \frac{1}{NO}\cdot F^{-1}\{F\{|S(x, y)|^2 * \text{conj}(F\{|S(x, y)|^2\})\}.$$

Additionally, the method includes initializing a second set of parameters, $\Theta_i = \{\alpha_i, [\mu_{X_i}\mu_{Y_i}], \Sigma_i\}$, of the first cell based on the first set of parameters, initializing a likelihood function based on the first and second sets of parameters, and maximizing the likelihood function to obtain updated parameters. Further, the method calculates an updated intensity ACF based on the updated parameters, iteratively returns to maximizing the likelihood function until convergence of the updated intensity ACF, and stores the estimated ACF parameters in a matrix. The method iteratively returns to obtaining initial estimates of a first set of parameters for each of the plurality of cells and segments textures of the sonar image based on the estimated texture parameters of the cells.

The step of obtaining initial estimates further includes estimating a mean intensity, $$\hat{\mu}_I = \frac{1}{NO}\sum_{x_i}\sum_{y_i}S(x_i, y_i),$$

and estimating an imaging point spread function (PSF) ACF, $\hat{R}_h(X, Y)$, for the cell via discrete two-dimensional Fourier transform based on said mean intensity:

$$\hat{R}_h(X, Y) = \frac{(\hat{\mu}_I)^{-1}}{NO}\cdot F^{-1}\{F\{S(x, y)\} * \text{conj}(F\{S(x, y)\})\}.$$

The step of obtaining initial estimates also includes estimating PSF definition variables, $\hat{\beta}_x$ and $\hat{\beta}_y$, via least squares matrix computation based on $\hat{R}_h(X, Y)$ and $\hat{\mu}_I$, and estimating shape parameter, $\hat{v}$, via K-distributed clutter parameter estimation.

The step of maximizing the likelihood function further includes calculating likelihood parameters, obtaining an updated likelihood function based on the likelihood parameters, iteratively returning to calculating the likelihood parameters until convergence of the updated likelihood function, and obtaining the updated parameters based on the updated likelihood function. The step of calculating likelihood parameters further includes calculating a first likelihood parameter $E_j\{\tau_i^{(j)}([\overline{x_j},\overline{y_j}]|\Theta_i^{(j-1)})\}$ from the expression $$\langle \tau_i^{(k)} | \Theta_i^{(k-1)} \rangle_j = \frac{\alpha_i^{(k-1)} G_i\left([\overline{x_j},\overline{y_j}]|[\mu_{X_i}^{(k-1)} \mu_{Y_i}^{(k-1)}], \sum_i^{(k-1)}\right)}{\sum_{i=1}^{M} \alpha_i^{(k-1)} G_i\left([\overline{x_j},\overline{y_j}]|[\mu_{X_i}^{(k-1)} \mu_{Y_i}^{(k-1)}], \sum_i^{(k-1)}\right)},$$

where $$G_i\left([\mu_{X_i}\mu_{Y_i}], \sum_i\right) = (2\pi)^{-1} |\sum_i|^{-\frac{1}{2}} e^{-\frac{1}{2}[[X\ Y]-[\mu_{X_i}\mu_{Y_i}]]\sum_i^{-1}[[X\ Y]^T-[\mu_{X_i}\mu_{Y_i}]^T]}.$$

Also, calculating the likelihood parameters includes calculating a scale parameter $$\alpha_i^{(k)} = \frac{\sum_{j=1}^{v} m_j(\Theta^{(k)}) \langle \tau_i^{(k)} | \Theta_i^{(k-1)} \rangle_j}{\sum_{j=1}^{v} m_j(\Theta^{(k)})},$$

where $$m_j(\Theta^{(k)}) = \begin{cases} n_j, & j = 1, \ldots, r \\ n \cdot \frac{P_j(\Theta_j^{(k)})}{P(\Theta^{(k)})}, & j = r+1, \ldots, v, \text{ and } \frac{P_j(\Theta)}{P(\Theta)} \end{cases}$$

is a bin probability of an area defined by a resolution cell $(x_j, y_j)$.

The step of calculating the likelihood parameters further includes calculating a vector of component means $$[\mu_{X_i}^{(k)} \mu_{Y_i}^{(k)}]^T = \frac{\sum_{j=1}^{v} m_j(\Theta^{(k)}) \langle \tau_i^{(k)} | \Theta_i^{(k-1)} \rangle_j [\overline{x_j},\overline{y_j}]^T}{\sum_{j=1}^{v} m_j(\Theta^{(k)}) \langle \tau_i^{(k)} | \Theta_i^{(k-1)} \rangle_j},$$

and calculating a matrix variable $$\sum_i^{(k)} = \frac{\sum_{j=1}^{v} m_j(\Theta^{(k)}) \langle \tau_i^{(k)} | \Theta_i^{(k-1)} \rangle_j K^T K}{\sum_{j=1}^{v} m_j(\Theta^{(k)}) \langle \tau_i^{(k)} | \Theta_i^{(k-1)} \rangle_j},$$

where $K = [[\overline{x_j},\overline{y_j}] - [\mu_{X_i}^{(k)} \mu_{Y_i}^{(k)}]]$ and $\Sigma_i$ comprises correlation length parameters, $l_{x_i}$ and $l_{y_i}$, and ACF rotation parameter $\theta_i$.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the several views and wherein.

DESCRIPTION OF THE INVENTION

Figure 1:
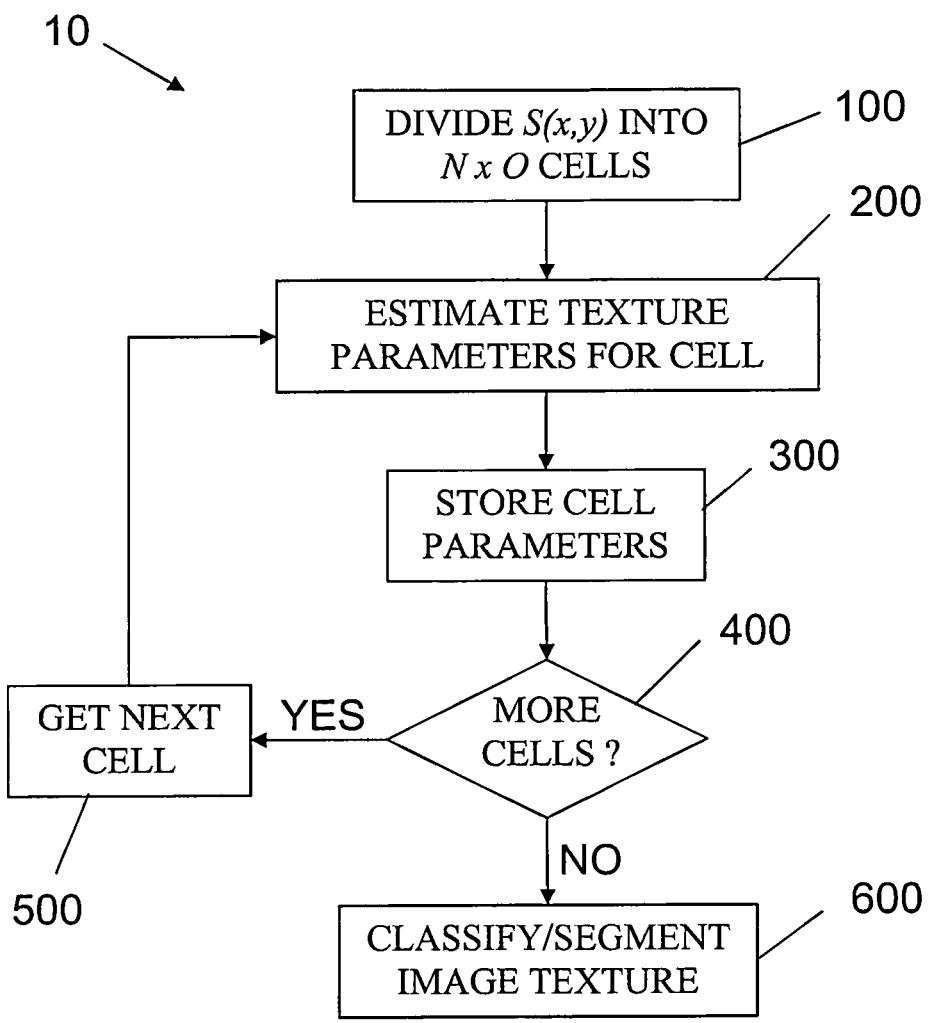
FIG. 1 illustrates a block diagram of a method for implementing sonar image feature segmentation.

As previously described herein with relation to Equation (1), the compound K-distribution has been used to model sonar image pixel statistics. In deriving Equation (1), the sonar intensity scene is treated as being composed of exponentially-distributed speckle modulated by a gamma-distributed parameter in the form of a product of two random variables. Along with its intuitive appeal, this convention allows for the introduction of correlated texture through a correlated gamma distribution. However, as also previously noted, pixel statistical parameter estimation in Equation (1) assumes independence between pixel samples and correlation between neighboring pixels is ignored.

To describe two-dimensional correlations in the imagery, the following known expression for the normalized intensity ACF can be used:

$$R_{I_N}(X, Y) = \frac{R_I(X, Y)}{\mu_I^2} - 1 = [R_h(X, Y)]^2 + \qquad (2)$$

$$\frac{1}{v} \cdot \sum_i \eta_i \cdot l_{x_i} l_{y_i} |\sum_i|^{\frac{1}{2}} \cdot \left[ e^{\frac{1}{2}[[X\ Y]-[\mu_{X_i}\mu_{Y_i}]]\sum_i^{-1}[[X\ Y]^T-[\mu_{X_i}\mu_{Y_i}]^T]} + [R_h(X, Y)]^2 \right],$$

where $\Sigma_i = \Psi_i \Lambda_i \Psi_i^T$. In this case, $\Lambda_i$ is a diagonal matrix of mixture component correlation length parameters $$\Lambda_i = \begin{bmatrix} l_{x_i}^2 & 0 \\ 0 & l_{y_i}^2 \end{bmatrix}, \qquad (3)$$

and $\psi_i$ is a mixture component rotation matrix $$\Psi_i = \begin{bmatrix} \cos\theta_i & \sin\theta_i \\ -\sin\theta_i & \cos\theta_i \end{bmatrix}, \qquad (4)$$

where $\theta_i$ is the counterclockwise rotation of the sonar cross section (SCS) ACF mixture component from the X-axis. To summarize, $\Sigma_i$ comprises correlation length parameters $l_{x_i}$ and $l_{y_i}$ and ACF rotation parameter $\theta_i$.

Other parameters of interest in Equation (2) are as follows:

$\mu_{X_i}$ and $\mu_{Y_i}$ are vectors of component means in the X-spatial and Y-spatial lag directions, respectively. In rippled textures, $\mu_{X_i}$ and $\mu_{Y_i}$ values correspond to the spatial period of the rippled texture;

$R_h(X, Y)$ is the autocorrelation function of the imaging point spread function. The variables fix $\beta_x$ and $\beta_y$ define this function, where $$R_h(X,Y) \triangleq e^{-\frac{1}{8} \cdot [X\ Y] B^{-1} [X\ Y]^T} \text{ and } B = \begin{bmatrix} \beta_x^2 & 0 \\ 0 & \beta_y^2 \end{bmatrix}.$$

The parameters $\beta_x$ and $\beta_y$ are directly proportional to the synthetic aperture sonar (SAS) image pixel resolution;

$\mu_I$ is the mean of the intensity image. The intensity ACF is normalized by this quantity so textures in images of different scales can be compared equally;

$\eta_i$ is the mixture component proportion; and $\nu$ is a shape parameter of single-point image pixel pdf.

As will be described in further detail hereinafter, the parameters of Equation (2) are estimated by sequentially estimating the parameters of $R_h(X, Y)$ using least-squares, $\nu$ using a known method for estimating parameters of K-distributed clutter, and the remaining parameters using an Expectation Maximization algorithm. Given estimates of the intensity ACF $\hat{R}_I$, the mean intensity $\hat{\mu}_I$, and the estimated parameters $\hat{\beta}_x$, $\hat{\beta}_y$, and $\hat{\nu}$, the remaining parameters $l_{x_i}$, $l_{y_i}$, $[\mu_{X_i}, \mu_{Y_i}]$, $\theta_i$, $\eta_i$, i={1, 2, ..., M} can be found by manipulating Equation (2), where M is the number of Gaussian mixture components.

Dropping reference to spatial lag (X, Y) to provide for compact notation hereafter, manipulation of Equation (2) yields $$\hat{R}_{I_N}^{(k+1)} - \hat{R}_h^2 \left[ 1 + \frac{i}{\nu} f^{(k)}(\eta_i, l_{x_i}, l_{y_i}) \right] = \qquad (5)$$

$$\frac{1}{\hat{\nu}} f^{(k+1)}(\eta_i, l_{x_i}, l_{y_i}) \cdot \left[ e^{\frac{1}{2}[[X\ Y] - [\mu_{X_i}\mu_{Y_i}]](\Sigma^{(k+1)})^{-1} [[X\ Y]^T - [\mu_{X_i}\mu_{Y_i}]^T]} \right],$$

where $$f(\eta_i, l_{x_i}, l_{y_i}) \triangleq \sum_i \eta_i \cdot l_{x_i} l_{y_i} |\Sigma_i|^{\frac{1}{2}}.$$

Those of skill in the art will recognize that the right hand side of Equation (5) is a scaled M-component Gaussian mixture model of the form $$C \cdot \sum_{i=1}^{M} \alpha_i G_i \left( [\mu_{X_i} \mu_{Y_i}], \sum_i \right), \text{ where} \qquad (6)$$

$$C = 2\pi \cdot \frac{\sum_j \eta_j l_{x_j} l_{y_j}}{\hat{\nu}} \text{ and} \qquad (7)$$

$$\alpha_i = \frac{\eta_i \cdot l_{x_i} \cdot l_{y_i}}{\sum_j \eta_j l_{x_j} l_{y_j}}, \qquad (8)$$

so that $\Sigma_i \alpha_i = 1$ and $$G_i \left( [\mu_{X_i} \mu_{Y_i}], \sum_i \right) = (2\pi)^{-1} |\Sigma_i|^{\frac{1}{2}} e^{\frac{1}{2}[[X\ Y] - [\mu_{X_i}\mu_{Y_i}]]\Sigma_i^{-1}[[X\ Y]^T - [\mu_{X_i}\mu_{Y_i}]^T]}.$$

Using the known EM algorithm for truncated two-dimensional Gaussian mixture models, the parameters $\Theta^{(k)} = \{\alpha_1^{(k)}, \ldots, \alpha_M^{(k)}, [\mu_{X_1}^{(k)}\ \mu_{Y_1}^{(k)}], \ldots, [\mu_{X_M}^{(k)}\ \mu_{Y_M}^{(k)}], \Sigma_1^{(k)}, \ldots, \Sigma_M^{(k)}\}$ at step k are found by maximizing the likelihood function $$L(\Theta^{(k)}) = \sum_X \sum_Y g^{(k)}(X,Y) \cdot \ln C^{(k)} \cdot \sum_{i=1}^{M} \alpha_i^{(k)} G_i^{(k)} \left( [\mu_{X_i}^{(k)} \mu_{Y_i}^{(k)}], \sum_i^{(k)} \right) \qquad (9)$$

where $$g^{(k)}(X,Y) = \left[ \frac{\hat{R}_I}{\hat{\mu}_\sigma^2} - 1 - \hat{R}_h^2 \left[ 1 + \frac{1}{\hat{\nu}} f(\eta_i^{(k-1)}, l_{x_i}^{(k-1)}, l_{y_i}^{(k-1)}) \right] \right]. \qquad (10)$$

After convergence at step k, the new values for $l_{x_i}^{(k)}$, $l_{y_i}^{(k)}$, and $\eta_i^{(k)}$ are calculated by $$\begin{bmatrix} (l_{x_i}^{(k)})^2 & 0 \\ 0 & (l_{y_i}^{(k)})^2 \end{bmatrix} = (\hat{\Psi}_i^{(k)})^T \Sigma_i^{(k)} \Psi_i^{(k)} - 2\hat{B} \text{ and} \qquad (11)$$

$$\eta_i^{(k)} = \frac{\alpha_i^{(k)} \cdot (l_{x_i}^{(k)} \cdot l_{y_i}^{(k)})^{-1}}{\Sigma_j \alpha_j^{(k)} \cdot (l_{x_j}^{(k)} \cdot l_{y_j}^{(k)})^{-1}} \qquad (12)$$

under the constraint $\Sigma_j \eta_j = 1$, and where $\hat{B}$ is the diagonal matrix of estimated imaging PSF correlation lengths and $\hat{\Psi}_i^{(k)}$ is found via singular value decomposition of $\Sigma_i^{(k)}$.

Equations (9) and (10) are then updated with new values for $f(\eta_i, l_{x_i}, l_{y_i})^{(k)}$ and $\Theta^{(k)}$. The parameter set $\Theta^{(k+1)}$ is updated via the EM algorithm in the next iteration. The algorithm iterates between the aforementioned update steps until convergence.

Upon convergence, the estimates $\hat{l}_{x_i}$, $\hat{l}_{y_i}$, and $\hat{\eta}_i$, i=1, ..., M, are recovered via Equations (11) and (12). Using Equation (4), the variable $\hat{\theta}_i$ is recovered by $$\hat{\theta}_i = \tan^{-1} \left( \frac{\hat{\Psi}_i(1,2)}{\hat{\Psi}_i(1,1)} \right), \qquad (13)$$

where $\hat{\Psi}_i(m,n)$ is the element on the m-th row and n-th column of matrix $\hat{\Psi}_i$.

The update equations for the parameters $\Theta^{(k)}$ are as follows:

$$\langle \tau_i^{(k)} | \Theta^{(k-1)} \rangle_j = \frac{\alpha_i^{(k-1)} G_i([\overline{x_j}, \overline{y_j}] | [\mu_{X_i}^{(k-1)} \mu_{Y_i}^{(k-1)}], \Sigma_i^{(k-1)})}{\sum_{i=1}^{M} \alpha_i^{(k-1)} G_i([\overline{x_j}, \overline{y_j}] | [\mu_{X_i}^{(k-1)} \mu_{Y_i}^{(k-1)}], \Sigma_i^{(k-1)})}, \quad (14)$$

$$m_j(\Theta^{(k)}) = \begin{cases} n_j, & j = 1, \ldots, r \\ n \cdot \dfrac{P_j(\Theta_j^{(k)})}{P(\Theta^{(k)})}, & j = r+1, \ldots, \nu \end{cases}, \quad (15)$$

$$\alpha_i^{(k)} = \frac{\sum_{j=1}^{\nu} m_j(\Theta^{(k)}) \langle \tau_i^{(k)} | \Theta_i^{(k-1)} \rangle_j}{\sum_{j=1}^{\nu} m_j(\Theta^{(k)})}, \quad (16)$$

$$[\mu_{X_i}^{(k)} \mu_{Y_i}^{(k)}]^T = \frac{\sum_{j=1}^{\nu} m_j(\Theta^{(k)}) \langle \tau_i^{(k)} | \Theta_i^{(k-1)} \rangle_j [\overline{x_j}, \overline{y_j}]^T}{\sum_{j=1}^{\nu} m_j(\Theta^{(k)}) \langle \tau_i^{(k)} | \Theta_i^{(k-1)} \rangle_j}, \text{ and} \quad (17)$$

$$\Sigma_i^{(k)} = \frac{\sum_{j=1}^{\nu} m_j(\Theta^{(k)}) \langle \tau_i^{(k)} | \Theta_i^{(k-1)} \rangle_j K^T K}{\sum_{j=1}^{\nu} m_j(\Theta^{(k)}) \langle \tau_i^{(k)} | \Theta_i^{(k-1)} \rangle_j}, \quad (18)$$

where $K = [[\overline{x_j}, \overline{y_j}] - [\mu_{X_i}^{(k)} \mu_{Y_i}^{(k)}]]$.

Referring to update Equation (15), $j = 1, \ldots, r, r+1, \ldots, \nu$ refers to the index of the resolution cells over which the mixture function is defined. Indices $1, \ldots, r$ are cells that contain a valid estimate, while indices $r+1, \ldots, \nu$ define resolution cells with truncated or missing data. Further, $n_j$ is the bin count of the resolution cell with index j. Also, $$n \triangleq \sum_{j=1}^{r} n_j.$$

In addition, $$\frac{P_j(\Theta)}{P(\Theta)}$$

is the bin probability of the area defined by the resolution cell $(x_j, y_j)$:

$$P_j(\Theta) = \int_{x_j,} \int_{y_j} f(x, y | \Theta) dx dy, \text{ where} \quad (19)$$

$$f(x, y | \Theta) = \sum_{i=1}^{M} \alpha_i G_i \left( x, y | [\mu_{x_i} \mu_{y_i}], \sum_i \right) \text{ and} \quad (20)$$

$$P(\Theta) = \sum_{j=1}^{r} P_j(\Theta). \quad (21)$$

Referring now to FIG. 1, there is shown a block diagram of a method 10 for implementing sonar image feature segmentation. At block 100, a complex beamformed SAS image, S(x,y), is divided into N×O overlapping cells. The amount of overlap is a tradeoff between texture parameter resolution and processing speed. Block 200 estimates the ACF parameters for each cell, as described hereinabove and further described hereinafter.

Based on the estimated parameters for a cell, the cell texture parameters are stored at block 300. If there are more cells, as determined at block 400, method 10 returns to estimate parameters for the next cell (block 500). If all cells have been processed, method 10 classifies or segments the image textures (block 600) via pattern classification algorithms known to those of skill in the art. Such image feature or texture segmentation finds further use in such fields as target recognition and environmental characterization.

Figure 2:
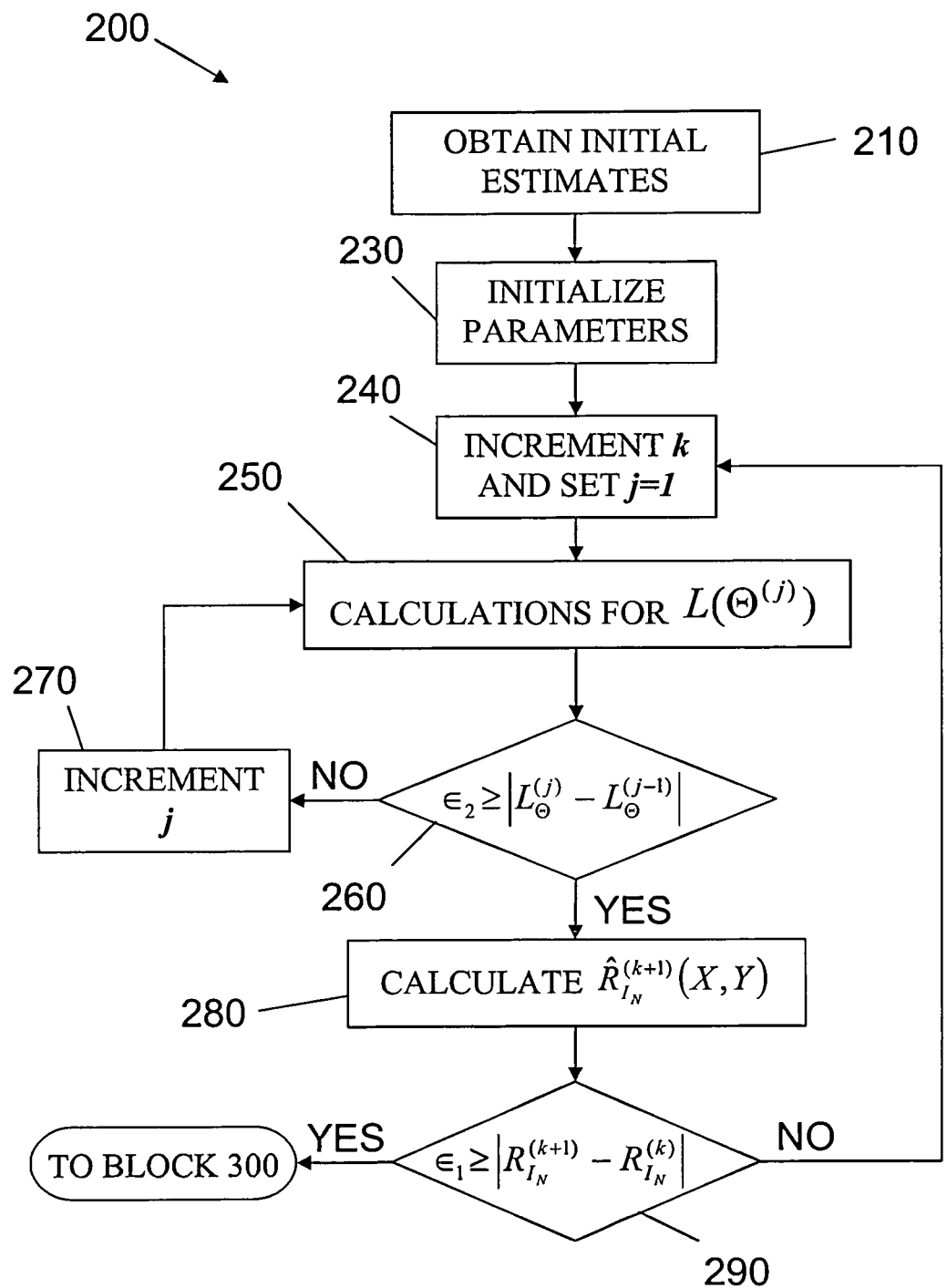
FIG. 2 illustrates a block diagram of a parameter estimation portion of the method of FIG. 1.

Referring now to FIG. 2, there is shown a block diagram corresponding to block 200 of FIG. 1. At block 210, initial estimates for the mean intensity, $\hat{\mu}_o$, the imaging PSF ACF, $\hat{R}_h(X, Y)$, the intensity ACF, $\hat{R}_I(X, Y)$, the PSF variables $\hat{\beta}_x$ and $\hat{\beta}_y$, and shape parameter $\hat{\nu}$ are obtained.

Figure 3:
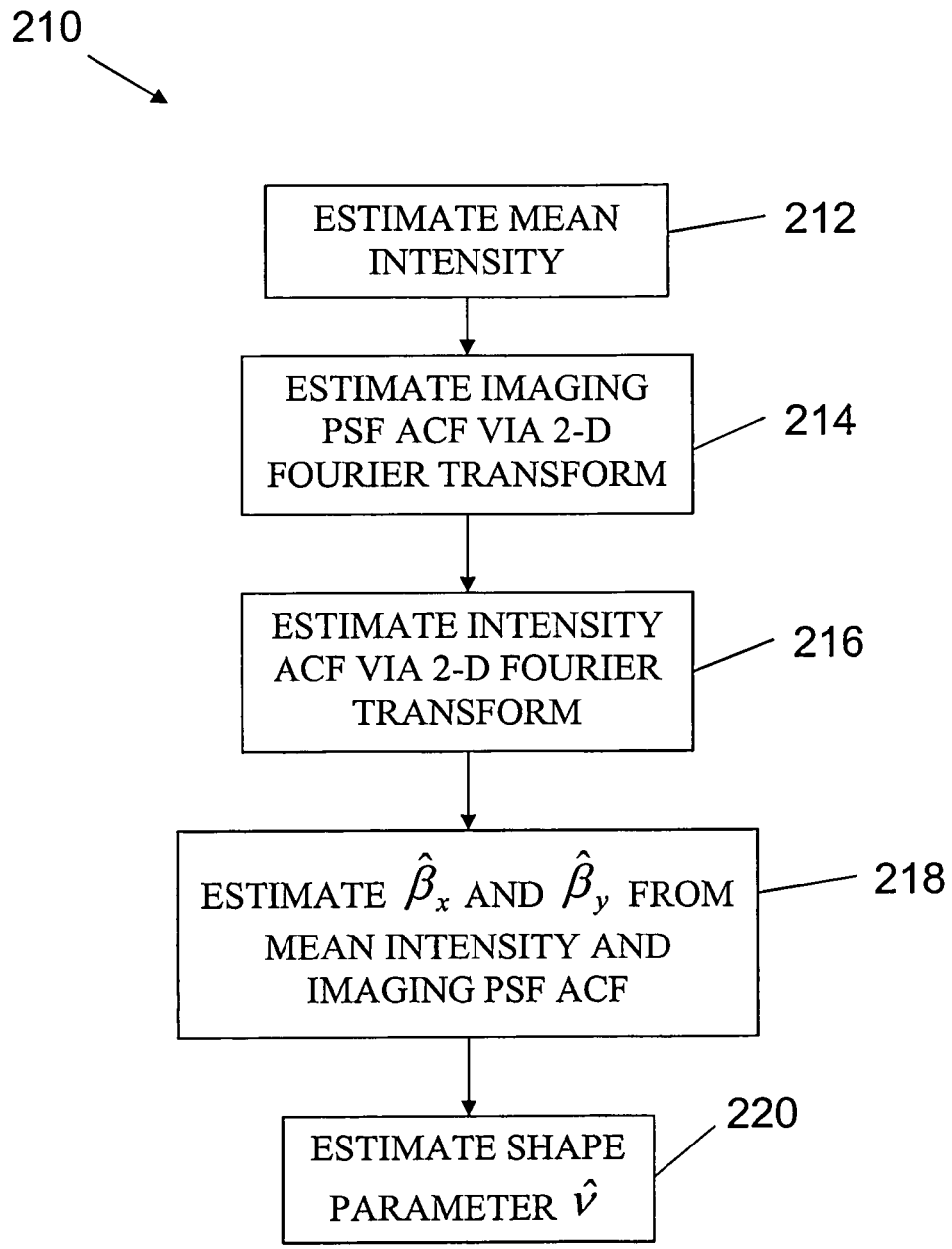
FIG. 3 illustrates a block diagram of an initial estimation portion of the method of FIG. 1.

Referring now to FIG. 3, there is shown a block diagram corresponding to block 210 of FIG. 1. At block 212, the mean intensity, $\hat{\mu}_o$, is estimated using the known expression $$\hat{\mu}_I = \frac{1}{NO} \sum_{x_i} \sum_{y_i} S(x_i, y_i).$$

As is known in the art, the imaging PSF ACF, $\hat{R}_h(X, Y)$, can be estimated (block 214) via discrete 2-D Fourier transform:

$$\hat{R}_h(X, Y) = \frac{(\hat{\mu}_I)^{-1}}{NO} \cdot F^{-1}\{F\{S(x, y)\} \underset{*}{*} \text{conj}(F\{S(x, y)\})\}, \quad (22)$$

where $F\{\bullet\}$ is the discrete Fourier transform operator, $\text{conj}(\bullet)$ is the conjugate operator and $\underset{*}{*}$ is the element-wise array multiplication operator. Similarly, the intensity ACF, $\hat{R}_I(X, Y)$, is estimated at block 216 via:

$$\hat{R}_I(X, Y) = \frac{1}{NO} \cdot F^{-1}\{F\{|S(x, y)|^2\} \underset{*}{*} \text{conj}(F\{|S(x, y)|^2\})\}. \quad (23)$$

At block 218, $\hat{\beta}_x$ and $\hat{\beta}_y$ are estimated via known least-squares matrix computation using the estimates of $\hat{R}_h(X, Y)$ and $\hat{\mu}_I$ obtained at blocks 214 and 212, respectively. The estimate of shape parameter $\hat{\nu}$ is obtained at block 220 using the known method for estimating parameters of K-distributed clutter.

Referring back to FIG. 2, parameters are initialized at block 230, including the parameter set $\Theta_i = \{\alpha_i, [\mu_{X_i} \mu_{Y_i}], \Sigma_i\}$ for $i = 1, \ldots, M$, where M is the number of Gaussian mixture components. Additionally, index k is set equal to 0, error variables $\epsilon_1$ and $\epsilon_2$ are set, and the likelihood function, $L(\Theta^0)$, is initialized via Equations (10)-(12). As was the case with the overlap amount, the values for $\epsilon_1$ and $\epsilon_2$ are a tradeoff between texture parameter resolution and processing speed.

Figure 4:
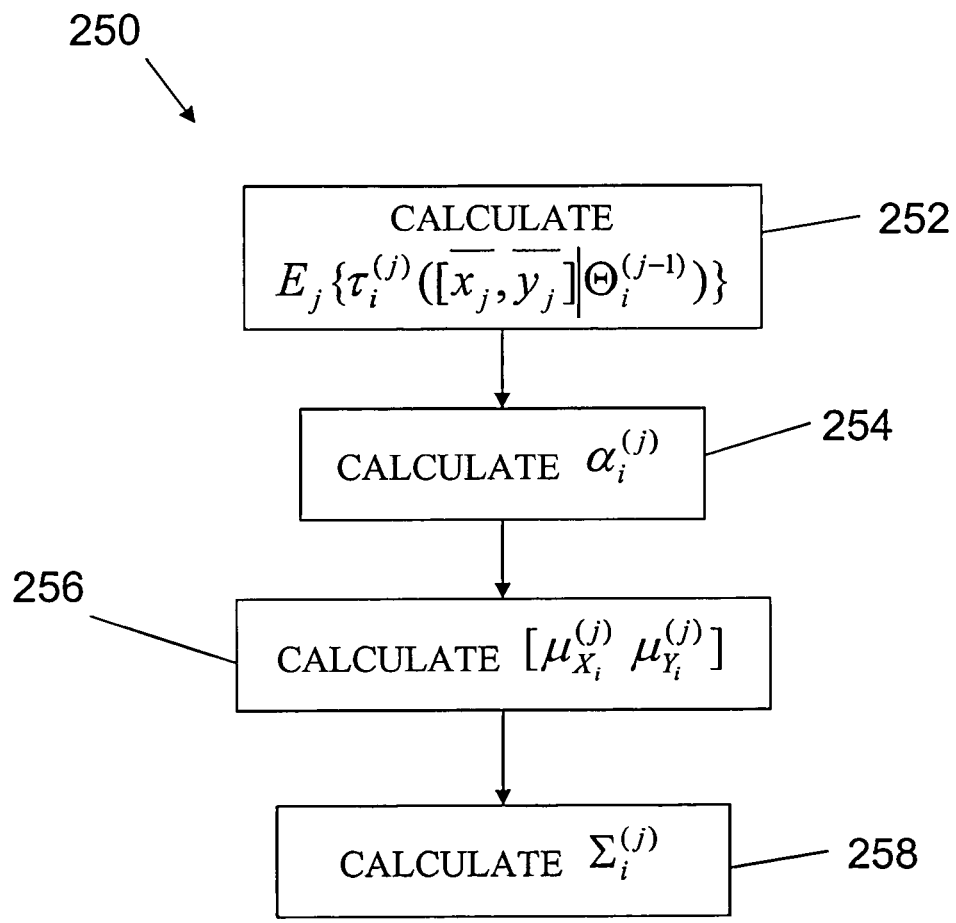
FIG. 4 illustrates a block diagram a likelihood function calculating portion of the method of FIG. 1.

At block 240, index k is incremented and index j is set equal to 1. Block 250 performs calculations for maximizing the likelihood function. Referring now to FIG. 4, there is shown a block diagram corresponding to block 250 of FIG. 2. Block 252 calculates $E_j\{\tau_i^{(j)}([\overline{x_j}, \overline{y_j}]\nu\Theta_i^{(j-1)})\}$ via Equation (14), where $E_j$ is the known membership or partition function. Block 254 calculates $\alpha_i^{(j)}$ via Equation (16). Equation (17) is used to calculate $[\mu_{X_i}^{(j)} \mu_{Y_i}^{(j)}]$ at block 256 and $\Sigma_i^{(j)}$ is calculated at block 258 via Equation (18).

Block 260 determines if error variable $\epsilon_2 \geq |L_\Theta^{(j)} - L_\Theta^{(j-1)}|$, where $L_\Theta^{(j)}$ is obtained from Equations 9 and 10 using the values calculated at block 250. If not, method 10 increments index j at block 270 and returns to block 250. If block 260 is yes, $\hat{R}_{I_N}^{(k+1)}(X, Y)$ is calculated (block 280) via Equation (5) using $\hat{R}_I(X, Y)$, $\hat{\mu}_o$, and $\hat{R}_h(X, Y)$ from block 210 and $\eta_i^{(k)}$, $1_{x_i}^{(k)}, 1_{y_i}^{(k)}$, and $[\mu_{X_i}^{(j)} \mu_{Y_i}^{(j)}]$ from block 250.

If $|\hat{R}_{I_N}^{(k+1)}(X,Y) - \hat{R}_{I_N}^{(k)}(X,Y)|$ is greater than error variable $\delta_1$, as determined at block 290, method 10 returns to block 240. (For clarity of illustration, $|\hat{R}_{I_N}^{(k+1)}(X,Y) - \hat{R}_{I_N}^{(k)}(X,Y)|$ is shown as $|\hat{R}_{I_N}^{(k+1)} - \hat{R}_{I_N}^{(k)}|$ in FIG. 2). If the difference is less than or equal to $\epsilon_1$, method 10 returns the variables $\hat{l}_{x_i}, \hat{l}_{y_i}, \hat{\eta}_i$, $\hat{\theta}_i, [\hat{\mu}_{X_i} \hat{\mu}_{Y_i}]$ for i=1, ..., M, which are stored at block 300 and used in classifying the cell pattern at block 600 of FIG. 1.

Figure 5A:
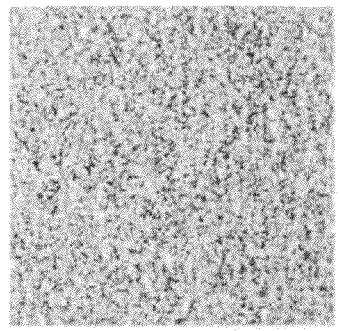
FIGS. 5A-D illustrate synthetic aperture sonar image textures.
Figure 5B:
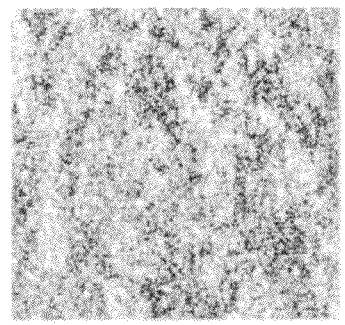
Figure 5C:
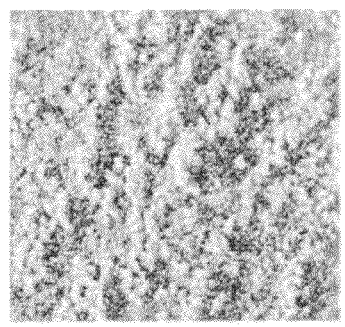
Figure 5D:
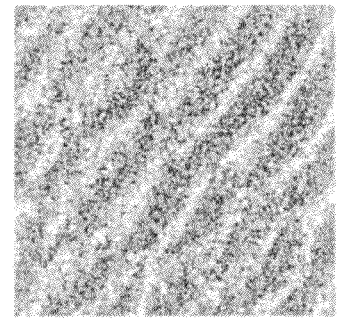
Figure 6A:
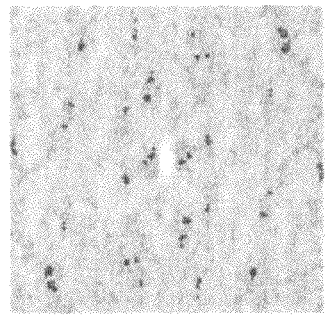
FIGS. 6A-D illustrate log intensity ACF estimates associated with the textures depicted in FIGS. 5A-5D, respectively.
Figure 6B:
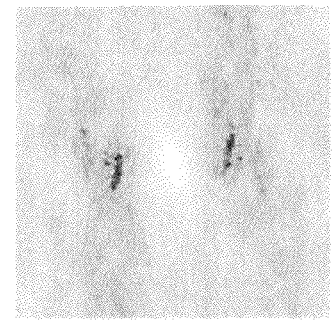
Figure 6C:
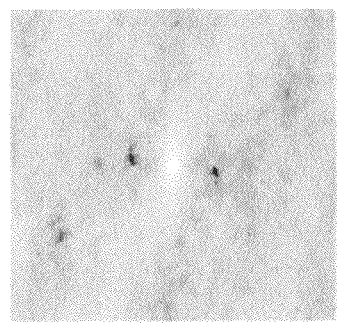
Figure 6D:
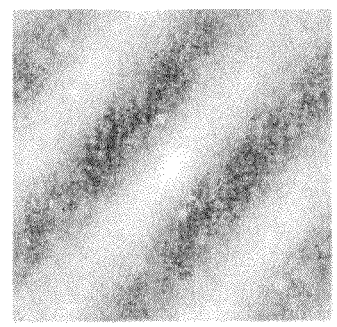
Figure 7A:
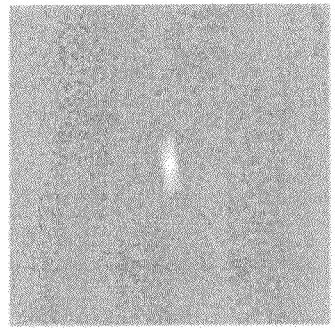
FIGS. 7A-D illustrate reconstructed log intensity ACFs resulting from applying the method of FIG. 1 to the textures depicted in FIGS. 5A-5D, respectively.
Figure 7B:
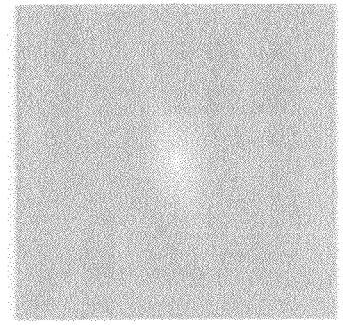
Figure 7C:
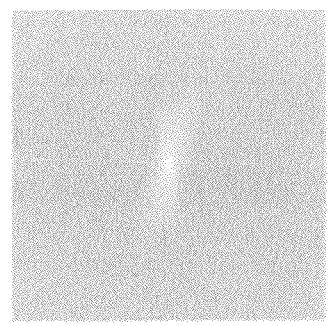
Figure 7D:
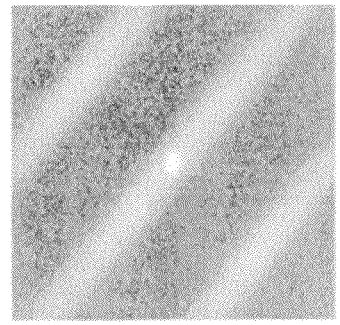

Referring now to FIGS. 5A-5D, there are depicted SAS image textures corresponding to hardpack sand (FIG. 5A), seagrass (FIG. 5B), rocky seabottom (FIG. 5C), and sand ripple (FIG. 5D). Referring also to FIGS. 6A-6D, there are shown the log intensity ACF estimates associated with the textures depicted in FIGS. 5A-5D, respectively. Applying method 10 to the estimated texture ACFs in FIGS. 6A-6D results in the reconstructed log intensity ACFs illustrated in FIGS. 7A-7D, respectively. The natural log of the intensity ACFs are displayed in FIGS. 6A-6D and FIGS. 7A-7D for ease of visual comparison.

Figure 8A:
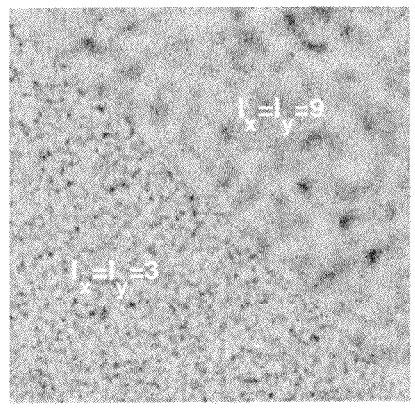
FIG. 8A illustrates an exemplary image having two synthetic textures.

Referring now to FIG. 8A, there is illustrated an exemplary image with two synthetic textures having a diagonal boundary between them running from the left upper corner to the right lower corner of FIG. 8A. The following parameter values are the same for the two synthetic textures: $\nu=0.0$ $\mu_X=\mu_Y=0$, $\theta=0°$, and $\beta_x=\beta_y=0.5$. The synthetic textures have differing values of $l_x=l_y=3$ and $l_x=l_y=9$, corresponding to the lower left and upper right of FIG. 8A, respectively.

Figure 8B:
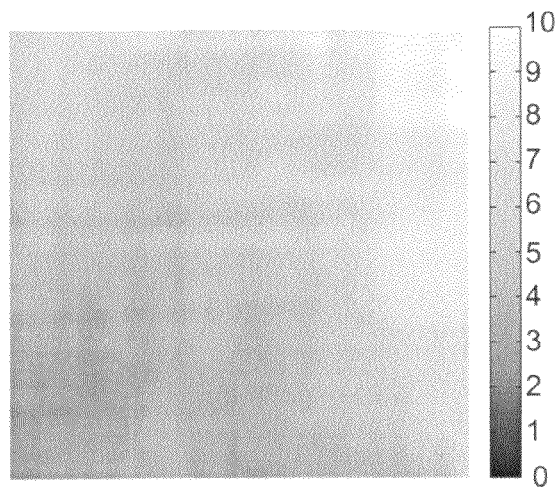
FIGS. 8B and 8C illustrate the respective $\hat{l}_x$ and $\hat{l}_y$ parameter estimations for the image of FIG. 8A.
Figure 8C:
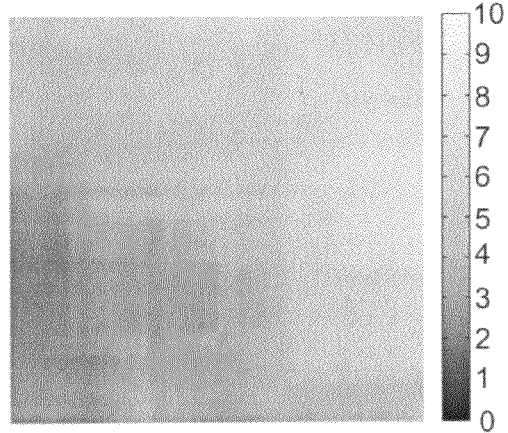

FIGS. 8B and 8C show the parameter estimations for the two textures, with estimated $\hat{l}_x$ shown in FIG. 8B and estimated $\hat{l}_y$ shown in FIG. 8C. As can be seen in FIGS. 8B and 8C, there are distinctive differences in the two texture regions, indicating that the ACF parameter values can be used to segment the image into discernable texture regions.

What has thus been described is a sonar image feature extractor wherein a parameterized statistical model is fitted to sonar image data to extract image texture features, such as correlation length, periodicity or ripple, orientation and other statistical descriptors. Such features can be used in automatic target recognition, through-the-sensor environmental characterization and texture segmentation schemes.

The sonar image texture segmentation method described herein estimates the parameters of an assumed statistical model from the pixel values in the sonar images. The model expands the known correlated K-distribution model into a Gaussian mixture model to allow more degrees of freedom including modeling periodicity. The model adds an angular component to parameterize rotation of the autocorrelation function about the vertical and horizontal axes. The model further provides a method to estimate texture parameters using an EM method for truncated data.

Complex, beamformed SAS images from a variety of sources can be used as input. Additional inputs include a processing cell size (N×O), the amount of cell overlap, the number of ACF mixture components, M, and image error thresholds, $\epsilon_1$ and $\epsilon_2$, for the ACF estimate and the EM algorithm for truncated or missing data, respectively.

Outputs of the sonar image texture segmentation method include a vector of estimated ACF model parameters that define the SAS image texture. Using the texture feature vectors for segmentation or classification, a labeled texture image is obtained.

The parameterized ACF model described herein is linked to realistic assumptions grounded in the physics of the scattering problem. The extracted features have intuitive meaning such as rotation and correlation length. This is in contrast with Markov random field parameters, which have been found to be difficult to understand when taken alone. Further, Markov parameters typically may rely on restrictive simplifying statistical assumptions, such as Gaussianity in some models. Thus, Markov parameters may not be tractably applied to image modeling problems. Additionally, the method described herein can result in significant man-hour savings in analyzing, documenting, archiving and retrieving seabed image data for hydrographic reconnaissance tasks.

Obviously many modifications and variations of the present invention may become apparent in light of the above teachings. For example, the estimated autocorrelation function of the sonar image data could be described by measures other than those described herein. For example, measures such as rotation, major axis length, minor axis length, and peak may be used. These measures would be similar to the ones extracted via the invention. However, in relying on a derivation of a valid statistical model from first principles of scattering within resolution cells, the sonar image feature extractor described herein uses a direct link to a statistical distribution.

It will be understood that many additional changes in details, materials, and arrangements of parts which have been described herein and illustrated in order to explain the nature of the invention, may be made by those skilled in the art within the principle and scope of the invention as expressed in the appended claims.

What is claimed is:

1. A method of texture segmentation for a sonar image, S(x,y), comprising using a processor to perform the steps of:
    obtaining initial estimates of a first set of parameters of said sonar image;
    obtaining an estimate of an intensity autocorrelation function (ACF) of said image;
    initializing a second set of parameters, $\Theta_i = \{\alpha_i, [\mu_{X_i}\mu_{Y_i}], \Sigma_i\}$ of said sonar image based on said first set of parameters;
    initializing a likelihood function based on said first and second sets of parameters;
    maximizing said likelihood function to obtain updated parameters;
    calculating an updated intensity ACF based on said updated parameters; and
    iteratively returning to maximizing said likelihood function until convergence of said updated intensity ACF.

2. The method of claim 1, wherein said step of obtaining said estimate of said intensity ACF comprises estimating said intensity ACF via discrete two-dimensional Fourier transform:

$$\hat{R}_I(X, Y) = \frac{1}{NO} \cdot F^{-1}\{F\{|S(x, y)|^2\} * \mathrm{conj}(F\{|S(x, y)|^2\})\},$$

for a (N×O) cell of said image.

3. The method of claim 1, wherein said step of obtaining initial estimates further comprises:
    estimating a mean intensity, $$\hat{\mu}_I = \frac{1}{NO} \sum_{x_i} \sum_{y_i} S(x_i, y_i),$$

for a (N×O) cell of said image;
    estimating an imaging point spread function (PSF) ACF, $\hat{R}_h(X,Y)$, for said cell via discrete two-dimensional Fourier transform based on said mean intensity:

$$\hat{R}_h(X, Y) = \frac{(\hat{\mu}_I)^{-1}}{NO} \cdot F^{-1}F\{\{S(x, y)\} * \mathrm{conj}(F\{S(x, y)\})\};$$

estimating PSF definition variables, $\hat{B}_x$ and $\hat{B}_y$, via least squares matrix computation based on $\hat{R}_h(X, Y)$ and $\hat{\mu}_I$; and estimating shape parameter, $\hat{v}$, via K-distributed clutter parameter estimation.

4. The method of claim 3, wherein said step of maximizing said likelihood function further comprises:

calculating a first likelihood parameter $E_j\{\tau_i^{(j)}([\overline{x_j}, \overline{y_j}]|\Theta_i^{(j-1)})\}$ from the expression $$\langle \tau_i^{(k)} | \Theta_i^{(k-1)} \rangle_j = \frac{\alpha_i^{(k-1)} G_i\left([\overline{x_j}, \overline{y_j}] | [\mu_{X_i}^{(k-1)} \mu_{Y_i}^{(k-1)}], \sum_i^{(k-1)}\right)}{\sum_{i=1}^{M} \alpha_i^{(k-1)} G_i\left([\overline{x_j}, \overline{y_j}] | [\mu_{X_i}^{(k-1)} \mu_{Y_i}^{(k-1)}], \sum_i^{(k-1)}\right)},$$

where $$G_i([\mu_{X_i}\mu_{Y_i}], \Sigma_i) = (2\pi)^{-1}|\Sigma_i|^{-\frac{1}{2}} e^{-\frac{1}{2}[XY]-[\mu_{X_i}\mu_{Y_i}]]\Sigma_i^{-1}[[XY]^T-[\mu_{X_i}\mu_{Y_i}]^T]};$$

calculating a scale parameter $$\alpha_i^{(k)} = \frac{\sum_{j=1}^{v} m_j(\Theta^{(k)}) \langle \tau_i^{(k)} | \Theta_i^{(k-1)} \rangle_j}{\sum_{j=1}^{v} m_j(\Theta^{(k)})},$$

where $$m_j(\Theta^{(k)}) = \begin{cases} n_j, & j = 1, \dots, r \\ n \cdot \frac{P_j(\Theta_j^{(k)})}{P(\Theta^{(k)})}, & j = r+1, \dots, v, \end{cases}$$

and $$\frac{P_j(\Theta)}{P(\Theta)}$$

is a bin probability of an area defined by a resolution cell $(x_j, y_j)$;

calculating a vector of component means $$[\mu_{X_i}^{(k)} \mu_{Y_i}^{(k)}]^T = \frac{\sum_{j=1}^{v} m_j(\Theta^{(k)}) \langle \tau_i^{(k)} | \Theta_i^{(k-1)} \rangle_j [\overline{x_j}, \overline{y_j}]^T}{\sum_{j=1}^{v} m_j(\Theta^{(k)}) \langle \tau_i^{(k)} | \Theta_i^{(k-1)} \rangle_j};$$

calculating a matrix variable $$\sum_i^{(k)} = \frac{\sum_{j=1}^{v} m_j(\Theta^{(k)}) \langle \tau_i^{(k)} | \Theta_i^{(k-1)} \rangle_j K^T K}{\sum_{j=1}^{v} m_j(\Theta^{(k)}) \langle \tau_i^{(k)} | \Theta_i^{(k-1)} \rangle_j},$$

where $K=[[\overline{x_j}, \overline{y_j}] - [\mu_{X_i}^{(k)} \mu_{Y_i}^{(k)}]]$ and $\Sigma_i$ comprises correlation length parameters, $l_{x_i}$ and $l_{y_i}$, and ACF rotation parameter $\Theta_i$;

obtaining an updated likelihood function based on said first likelihood parameter, said scale parameter, said vector of component means and said matrix variable;

iteratively returning to calculating said first likelihood parameter, said scale parameter, said vector of component means and said matrix variable until convergence of said updated likelihood function; and obtaining said updated parameters based on said updated likelihood function.

5. The method of claim 4, wherein said step of obtaining said estimate of said intensity ACF comprises estimating said intensity ACF via discrete two-dimensional Fourier transform:

$$\hat{R}_I(X, Y) = \frac{1}{NO} \cdot F^{-1}\left\{F\{|S(x, y)|^2 * \mathrm{conj}(F\{|S(x, y)|^2\})\right\}.$$

6. The method of claim 4, wherein said cell is a subset of said image and said method further comprises:

dividing said image into a plurality of said cells, wherein said cells overlap;

iteratively storing cell parameters associated with said updated intensity ACF for each of said plurality of cells; and classifying textures of said image based on said cell parameters stored for said plurality of cells.

7. The method of claim 1, further comprising classifying textures of said image based on parameters associated with said updated intensity ACF.

8. A method of segmenting textures in a sonar image, $S(x,y)$, comprising using a processor to perform the steps of:

dividing said image into a plurality of (N×O) cells, wherein said cells overlap;

obtaining initial estimates of a first set of parameters of a first of said cells;

obtaining an estimate of an intensity autocorrelation function (ACF), $\hat{R}_I(X, Y)$, of said first cell via discrete two-dimensional Fourier transform:

$$\hat{R}_I(X, Y) = \frac{1}{NO} \cdot F^{-1}\{F\{|S(x, y)|^{2*} \mathrm{conj}(F\{|S(x, y)|^2\})\};$$

initializing a second set of parameters, $\Theta_i = \{\alpha_i, [\mu_{X_i} \mu_{Y_i}], \Sigma_i\}$, of said first cell based on said first set of parameters;

initializing a likelihood function based on said first and second sets of parameters;

maximizing said likelihood function to obtain updated parameters;

calculating an updated intensity ACF based on said updated parameters;

iteratively returning to maximizing said likelihood function until convergence of said updated intensity ACF;

storing cell parameters associated with said updated intensity ACF;

iteratively returning to obtaining initial estimates of a first set of parameters for each of the plurality of cells; and segmenting textures of said sonar image based on said cell parameters stored for said plurality of cells.

9. The method of claim 8, wherein said step of obtaining initial estimates further comprises:

estimating a mean intensity, $$\hat{\mu}_I = \frac{1}{NO} \sum_{x_i} \sum_{y_i} S(x_i, y_i);$$

estimating an imaging point spread function (PSF) ACF, $\hat{R}_h(X,Y)$, for said cell via discrete two-dimensional Fourier transform based on said mean intensity:

$$\hat{R}_h(X, Y) = \frac{(\hat{\mu}_I)^{-1}}{NO} \cdot F^{-1}\{F\{S(x, y)\} * conj(F\{S(x, y)\})\};$$

estimating PSF definition variables, $\hat{\beta}_x$ and $\hat{\beta}_y$, via least squares matrix computation based on $\hat{R}_h(X,Y)$ and $\hat{\mu}_I$; and estimating shape parameter, $\hat{v}$, via K-distributed clutter parameter estimation.

10. The method of claim 9, wherein said step of maximizing said likelihood function further comprises:

calculating likelihood parameters;

obtaining an updated likelihood function based on said likelihood parameters;

iteratively returning to calculating said likelihood parameters until convergence of said updated likelihood function; and obtaining said updated parameters based on said updated likelihood function.

11. The method of claim 10, wherein said step of calculating likelihood parameters further comprises:

calculating a first likelihood parameter $E_j\{\tau_i^{(j)}([\overline{x}_j, \overline{y}_j]|\Theta_i^{(j-1)})\}$ from the expression $$\langle \tau_i^{(k)} | \Theta_i^{(k-1)} \rangle_j = \frac{\alpha_i^{(k-1)} G_i\left([\overline{x}_j, \overline{y}_j] | [\mu_{X_i}^{(k-1)} \mu_{Y_i}^{(k-1)}], \sum_i^{(k-1)}\right)}{\sum_{i=1}^{M} \alpha_i^{(k-1)} G_i\left([\overline{x}_j, \overline{y}_j] | [\mu_{X_i}^{(k-1)} \mu_{Y_i}^{(k-1)}], \sum_i^{(k-1)}\right)},$$

where $$G_i\left([\mu_{X_i}\mu_{Y_i}], \sum_i\right) = (2\pi)^{-1}|\sum_i|^{-\frac{1}{2}}e^{-\frac{1}{2}[[XY]-[\mu_{x_i}\mu_{y_i}]]\sum_i^{-1}[[XY]^T-[\mu_{x_i}\mu_{y_i}]^T]};$$

calculating a scale parameter $$\alpha_i^{(k)} = \frac{\sum_{j=1}^{v} m_j(\Theta^{(k)}) \langle \tau_i^{(k)} | \Theta_i^{(k-1)} \rangle_j}{\sum_{j=1}^{v} m_j(\Theta^{(k)})},$$

where $$m_j(\Theta^{(k)}) = \begin{cases} n_j, & j = 1, \ldots, r \\ n \cdot \frac{P_j(\Theta_j^{(k)})}{P(\Theta^{(k)})}, & j = r+1, \ldots, v, \end{cases}$$

and $$\frac{P_j(\Theta)}{P(\Theta)}$$

is a bin probability of an area defined by a resolution cell $(x_j, y_j)$;

calculating a vector of component means $$[\mu_{X_i}^{(k)} \mu_{Y_i}^{(k)}]^T = \frac{\sum_{j=1}^{v} m_j(\Theta^{(k)}) \langle \tau_i^{(k)} | \Theta_i^{(k-1)} \rangle_j [\overline{x}_j, \overline{y}_j]^T}{\sum_{j=1}^{v} m_j(\Theta^{(k)}) \langle \tau_i^{(k)} | \Theta_i^{(k-1)} \rangle_j};$$

and calculating a matrix variable $$\sum_i^{(k)} = \frac{\sum_{j=1}^{v} m_j(\Theta^{(k)}) \langle \tau_i^{(k)} | \Theta_i^{(k-1)} \rangle_j K^T K}{\sum_{j=1}^{v} m_j(\Theta^{(k)}) \langle \tau_i^{(k)} | \Theta_i^{(k-1)} \rangle_j},$$

where $K=[[\overline{x}_j, \overline{y}_j]-[\mu_{X_i}^{(k)} \mu_{Y_i}^{(k)}]]$ and $\Sigma_i$ comprises correlation length parameters $l_{x_i}$ and $l_{y_i}$ and ACF rotation parameter $\theta_i$.

* * * * *